2,927,124

PREPARATION OF TRIMETHOXYBOROXINE

Peter Bache Olmsted, Pittsburgh, and Charles A. Thomas, Glenshaw, Pa., assignors to Callery Chemical Company, Pittsburgh, Pa., a corporation of Pennsylvania No Drawing. Application May 16, 1955
Serial No. 508,812

6 Claims. (Cl. 260—462)

This invention relates to a new and improved method for the preparation of trimethoxyboroxine, $B_3O_3(OCH_3)_3$, and more particularly it relates to the preparation of trimethoxyboroxine by the reaction of boric oxide with mixtures of trimethyl borate and methanol or trimethyl borate-methanol azeotrope.

Trimethoxyboroxine was first isolated and characterized in 1951 by Goubeau and Keller who heated equimolar proportions of boric oxide and trimethyl borate in a closed bomb. Another method developed since that time involves the partial hydrolysis of trimethyl borate by reaction with water or boric acid. Neither of these methods are completely satisfactory on a commercial scale because they require relatively expensive pure trimethyl borate. Furthermore, the latter method results in the formation of the trimethyl borate-methanol azeotrope which must be separated to isolate the trimethyl borate for recycling. This increases the cost of the final product. It would therefore be highly desirable if trimethoxyboroxine could be prepared directly by using the trimethyl borate-methanol azeotrope which can be produced cheaply and in abundant quantities as an intermediate in the manufacture of trimethyl borate.

Trimethoxyboroxine is an important intermediate in the preparation of dimethoxyborane, $HB(OCH_3)_2$ and diborane, $B_2H_6$, as well as other boron-containing compounds. It is also useful as an extinguishing agent for metal fires and for testing boric oxide deposition in engines which burn boron-containing fuels. Because some investigators question the existence of trimethoxyboroxine as a compound, the term as used herein refers to a compound or composition of matter having the empirical formula $B_3O_6(CH_3)_3$.

It is an object of this invention to provide a new and useful method for preparing trimethoxyboroxine by the reaction of boric oxide with trimethyl borate-methanol azeotrope.

Another object is to provide an improved method for preparing trimethoxyboroxine by the reaction of boric oxide with mixtures of trimethyl borate and methanol.

Another object is to provide a simple and economical method for preparing the compound or composition of matter known as trimethoxyboroxine in which no azeotrope is formed as a by-product thus avoiding the expensive and time consuming separation problem of other prior processes.

Other objects will become manifest throughout the specification and claims as hereinafter related.

This new and improved method for preparing trimethoxyboroxine will be more fully described hereafter and the novelty thereof will be particularly pointed out and distinctly claimed.

This invention is based upon the discovery that boric oxide will react with mixtures of trimethyl borate and methanol or the trimethyl borate-methanol azeotrope directly to form trimethoxyboroxine according to the following chemical equation:

$$6B_2O_3 + 3B(OCH_3)_3 \cdot CH_3OH \rightarrow 4B_3O_3(OCH_3)_3 + 3HBO_2$$

The $HBO_2$ formed dissolves in the product resulting in a slightly higher boron content than that calculated for trimethoxyboroxine. If desired the dissolved $HBO_2$ can be removed by adding acetone or benzene which are miscible with the trimethoxyboroxine and thus cause the $HBO_2$ to settle out.

In one experiment, 8.0 mols of trimethyl borate-methanol azeotrope and 16.0 mols of boric oxide (20 mesh) were heated in a 2 liter flask equipped with a stirrer and reflux condenser. When the pot temperaturer eached 54° C., refluxing began. At 100° C. the heat was turned off and after 10 minutes an exothermic reaction occurred. The contents of the flask became gray and viscous. Reflux ceased as the reaction ended. The product was cooled and filtered through a fritted glass disk. The yield was quantitative and the product had a boron content of 17.6 milligram atoms per gram compared to the theoretical for trimethoxyboroxine of 17.3 milligram atoms per gram. The increased boron content can be attributed to the metaboric acid dissolved in the trimethoxyboroxine. The metaboric acid can be removed by treating the product with acetone or benzene which reduces the solubility of the $HBO_2$ forcing it to precipitate out. The trimethoxyboroxine can then be readily separated from the acetone or benzene by distillation since no azeotrope is formed.

In another experiment, 8 mols of trimethyl borate diluted with slightly more than 8 mols of methanol and a stoichiometric quantity of boric oxide (20 mesh) were placed in a 2 l. flask equipped with a stirrer and reflux condenser. The contents were heated to 100° C. at which point an exothermic reaction occurred as in the previous example. Refluxing ceased when the reaction ended. After cooling and filtering the product a yield of 1750 g. of product was obtained which represents 97.4% of theoretical. The clear liquid trimethoxyboroxine containing $HBO_2$ dissolved therein analyzed 17.8 milligram atoms of boron per gram.

In other experiments, it was found that the reaction proceeded satisfactorily in steel equipment as well as in all glass equipment. If the reaction is carried out using a few pounds of pressure, reflux is prevented and speeds up completion of the reaction. Refluxing of the reaction mixture may be carried out at a temperature of about 100° C.

According to the patent statutes, we have described the principles of this invention and the best mode contemplated for carrying it out. However, we do not wish to be restricted to the specific embodiments disclosed and therefore it should be understood that within the scope of the appended claims this invention may be practiced otherwise than as specifically described.

What we desire to claim and secure by United States Letters Patent is:

1. A method of preparing trimethoxyboroxine which comprises heating boric oxide and a mixture of trimethyl borate and methanol, said boric acid, trimethyl borate and methanol reacting in a mol ratio of about 6:3:3 respectively, to form a mixture of trimethoxyboroxine and metaboric acid and recovering the trimethoxyboroxine therefrom.

2. A method according to claim 1 in which the reaction mixture is refluxed at a temperature of about 100° C.

3. A method according to claim 2 in which the reaction mixture is heated under pressure at a temperature below the reflux temperature of said mixture.

4. A method according to claim 1 in which acetone is added to the mixture of trimethoxyboroxine and metaboric acid formed to precipitate the acid, then separating the acetone from the trimethoxyboroxine by distillation.

5. A method according to claim 1 in which benzene is added to the mixture of trimethoxyboroxine and metaboric acid formed to precipitate the acid, then separating the benzene from the trimethoxyboroxine by distillation.

6. A method of preparing trimethoxyboroxine which comprises heating boric oxide and an azeotropic mixture of trimethyl borate and methanol, where said oxide and azeotrope are present in stoichiometric ratios according to the equation:

$$6B_2O_3 + 3B(OCH_3)_3 \cdot CH_3OH \rightarrow 4B_3O_3(OCH_3)_3 + 3HBO_2$$

to form a mixture of trimethoxyboroxine and metaboric acid and recovering the trimethoxyboroxine therefrom.

References Cited in the file of this patent

UNITED STATES PATENTS 2,689,259  Schechter _____ Sept. 14, 1954

OTHER REFERENCES

Goubeau et al.: "Z. anorg. U. Allgem. Chem.," 267, pp. 1–26 (1951).

Schlesinger et al.: "J. Amer. Chem. Soc." 75, pp. 213–215 (1953).